A. A. RUSTEBERG.
HYDROCARBON GENERATOR AND BURNER.
APPLICATION FILED DEC. 17, 1917. RENEWED JUNE 5, 1919.
1,320,930.
Patented Nov. 4, 1919.
3 SHEETS—SHEET 1.
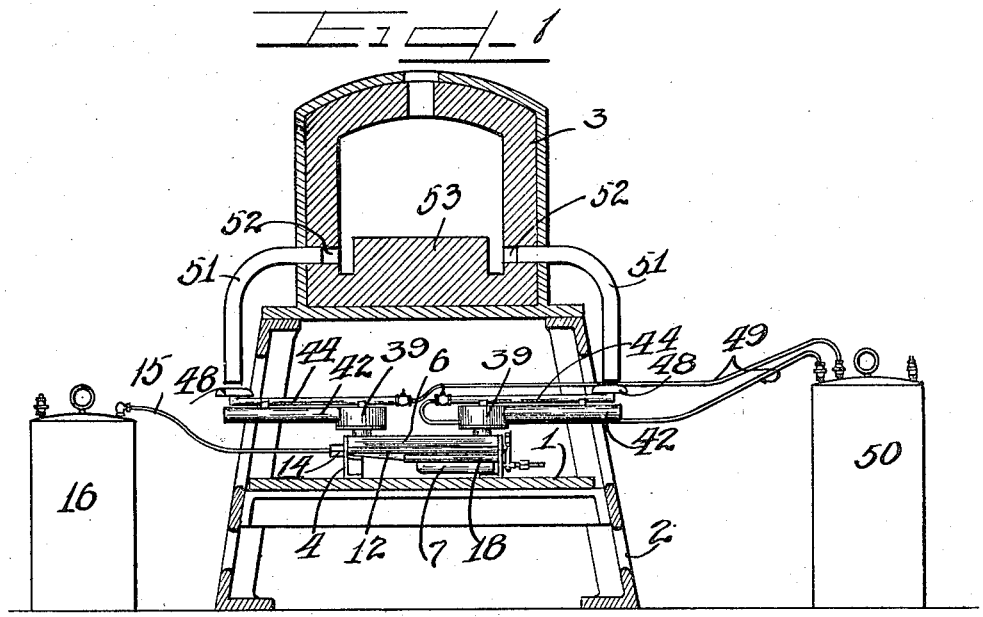
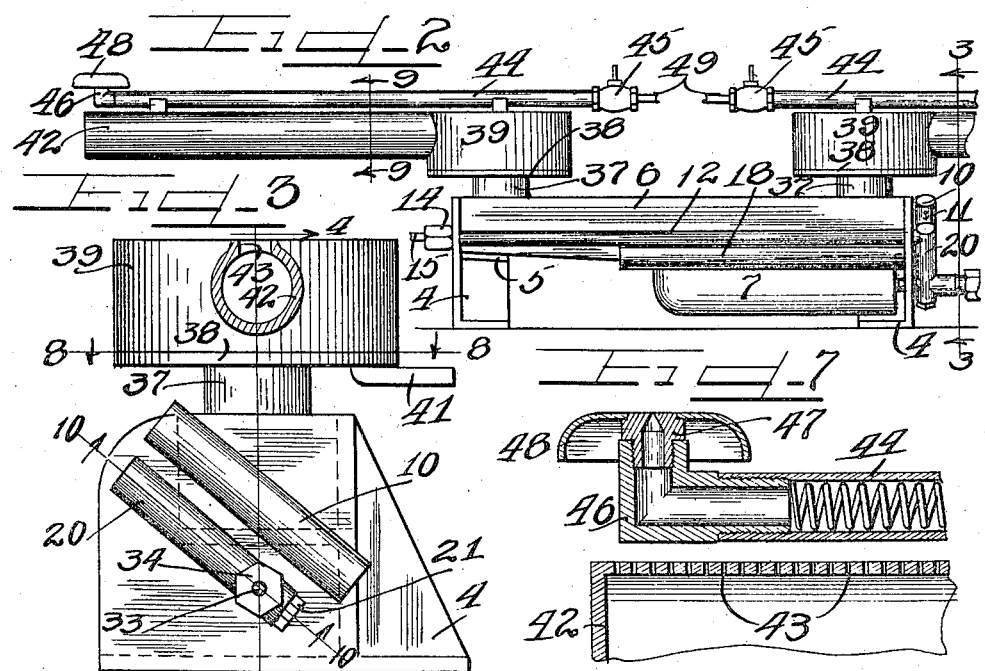

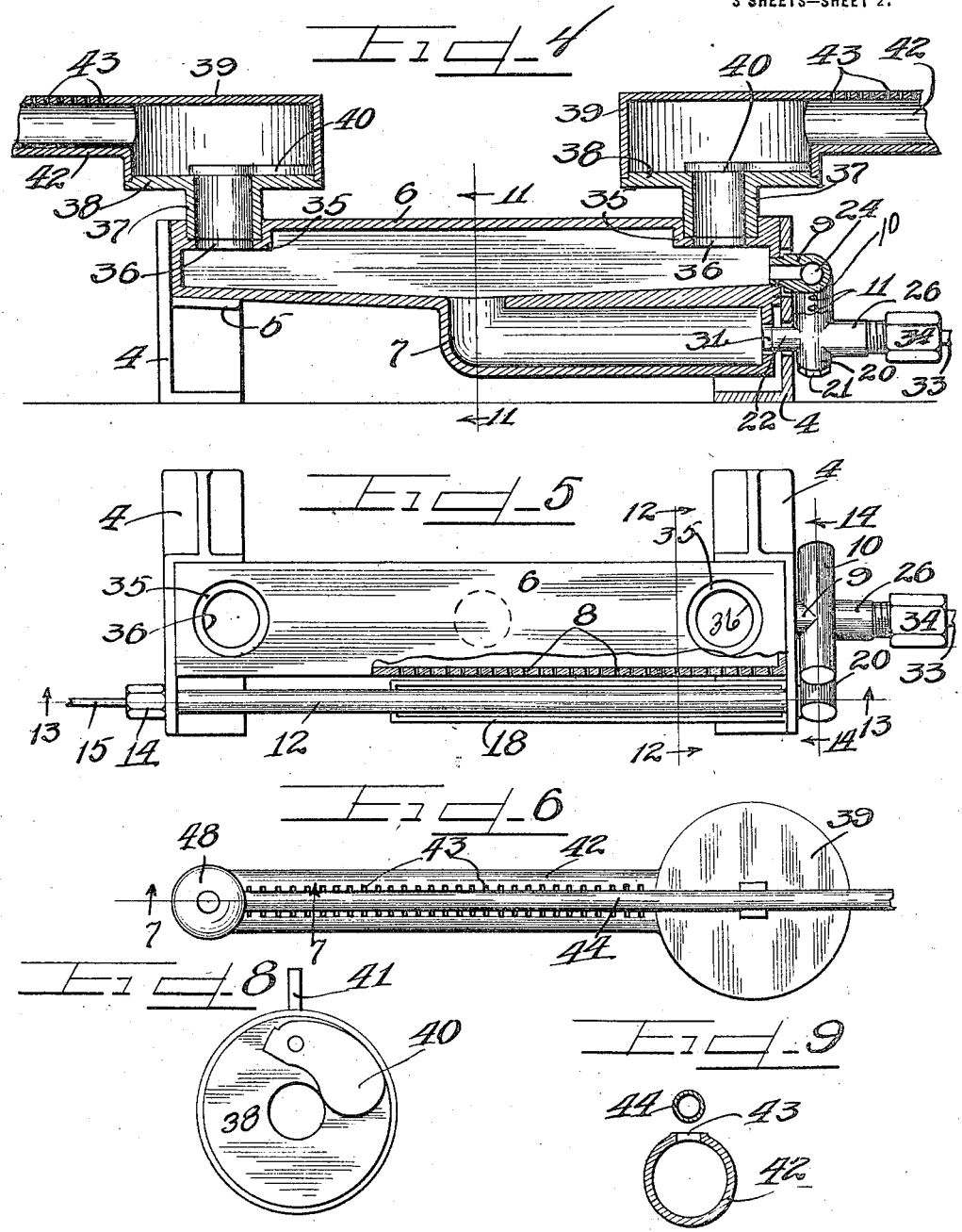

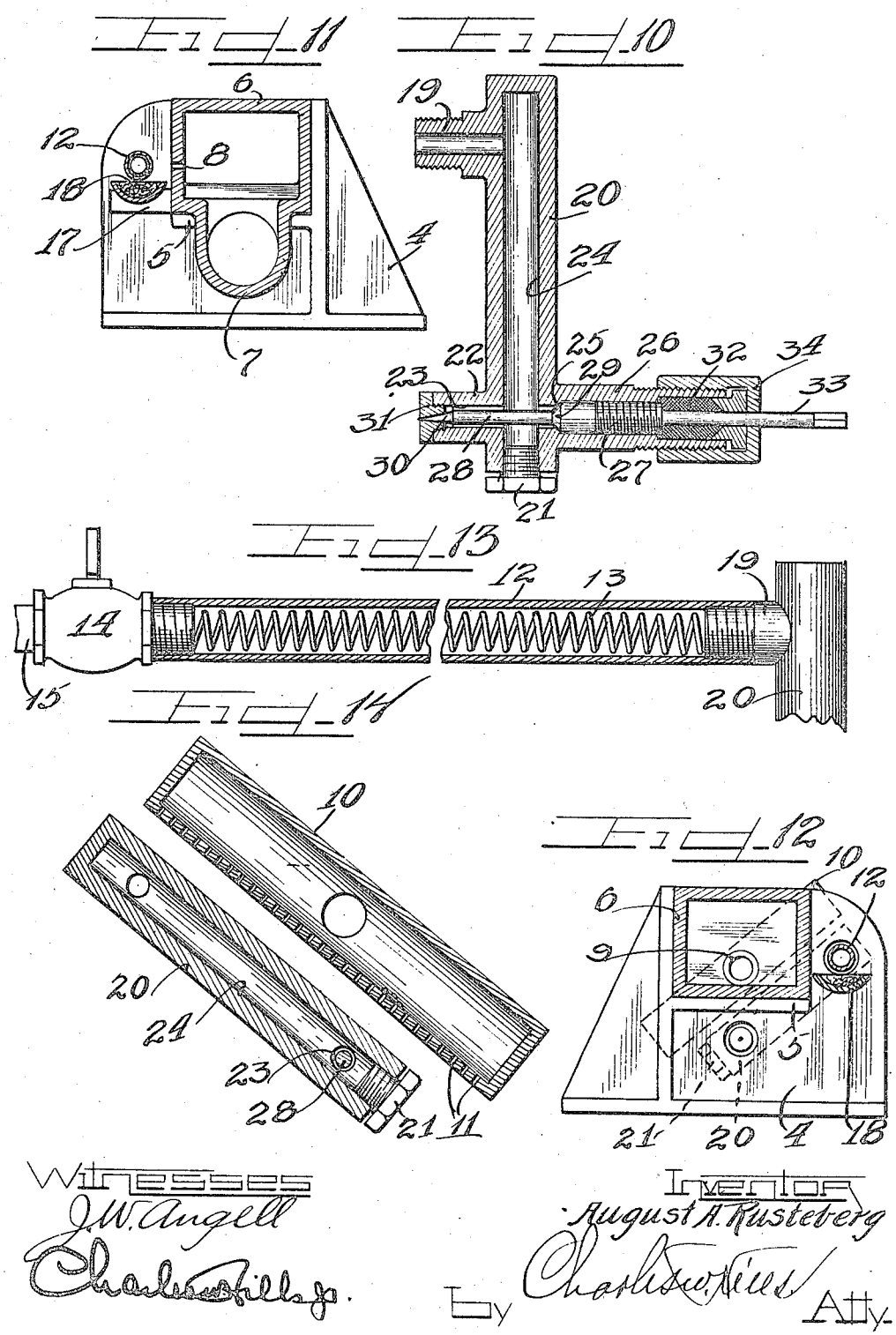

UNITED STATES PATENT OFFICE.

AUGUST A. RUSTEBERG, OF CHICAGO, ILLINOIS, ASSIGNOR, BY MESNE ASSIGNMENTS, TO THE CHAMPION KEROSENE-BURNER COMPANY, OF KENTON, OHIO, A CORPORATION OF OHIO.

HYDROCARBON GENERATOR AND BURNER.

1,320,930.   Specification of Letters Patent.   Patented Nov. 4, 1919.

Application filed December 17, 1917, Serial No. 207,501. Renewed June 5, 1919. Serial No. 301,995.

*To all whom it may concern:*

Be it known that I, AUGUST A. RUSTEBERG, a citizen of the United States, and a resident of the city of Chicago, in the county of Cook and State of Illinois, have invented certain new and useful Improvements in Hydrocarbon Generators and Burners; and I do hereby declare that the following is a full, clear, and exact description of the same, reference being had to the accompanying drawings, and to the numerals of reference marked thereon, which form a part of this specification.

This invention relates to an improved type of a hydrocarbon gas generating mechanism adapted for use in connection with stoves or furnaces and embracing simultaneously acting primary and secondary gas generating burners, said primary burner acting to generate gas for use in the secondary burner, which in turn acts to generate an oil gas adaptable for use in furnaces or other similar devices.

It is an object of this invention to provide a gas generating oil burner, the gas nozzles of which are heated to prevent carbonization of the same.

It is also an object of this invention to construct a hydrocarbon generator wherein a primary gas generator generates a gas adapted to be used as a fuel in a secondary gas generator which heats nozzled oil containers whereby the oil therein is volatilized and converted into a fuel gas by carbureting air therewith.

Another object of this invention is the construction of a fuel gas generating device wherein a plurality of oil volatilizing mechanisms are used to generate an oil-gas adaptable for use as a fuel in furnaces and stoves.

It is furthermore an object of this invention to provide a fuel gas generating device wherein oil fed into a primary generator is volatilized by a starting burner to produce an oil-gas to be burned in a secondary generator to heat oil fed thereto to volatilize said oil which escapes through heated nozzles and mixes with air to carburet said air to form a fuel gas producing a very hot flame adapted for use in stoves, furnaces and other devices.

An important object of this invention is the production of a fuel gas generator wherein an oil which is volatilized is permitted to escape through gas nozzles which, during the process of gas generation, are continuously heated to prevent the volatilized oil from cooling before it is mixed with air, and thereby also preventing the carbonization of the gas nozzles.

Other and further important objects of this invention will be apparent from the disclosures in the specification and drawings.

The invention (in a preferred form) is illustrated in the drawings and hereinafter more fully described.

On the drawings:

Figure 1 is a sectional view of a furnace equipped with an oil-gas generator and burner embodying the principles of this invention.

Fig. 2 is an elevational view of the generator and burner with parts broken away.

Fig. 3 is an enlarged end view thereof taken on line 3—3 of Fig. 2, with parts omitted.

Fig. 4 is a section taken on line 4—4 of Fig. 3, with parts broken away.

Fig. 5 is a top plan view of the device with the main burners removed and with parts broken away to show the construction.

Fig. 6 is a top plan view of one end of the secondary burner.

Fig. 7 is an enlarged fragmentary detail section taken on line 7—7 of Fig. 6.

Fig. 8 is a view taken on line 8—8 of Fig. 3.

Fig. 9 is a detail section taken on line 9—9 of Fig. 2.

Fig. 10 is an enlarged detail section taken on line 10—10 of Fig. 3, with parts shown in elevation.

Fig. 11 is a sectional view taken on line 11—11 of Fig. 4.

Fig. 12 is a sectional view taken on line 12—12 of Fig. 5.

Fig. 13 is an enlarged detail section taken on line 13—13 of Fig. 5, with parts shown in elevation.

Fig. 14 is an enlarged detail section taken on line 14—14 of Fig. 5.

As shown on the drawings:

The hydro-carbon generator and burner embodying the principles of this invention is shown in Fig. 1, mounted upon a shelf 1, of a framework 2, upon which is mounted a furnace 3, of any desired type adapted to be heated by means of a generator gas. Secured upon the shelf 1, are end frame bases 4, spaced opposite one another and provided with an integral support or shelf 5, upon which is securely seated a storage tank or primary gas reservoir 6, having integrally formed or rigidly secured to the bottom thereof a fuel mixing or carbureting pipe 7, one end of which communicates with the interior of the storage tank 6, and the other end of which is open, and disposed opposite the inner surface of the end wall of one of the end frames 4. The front wall of the storage tank 6, is provided with a plurality of alined apertures or openings 8, to afford a primary generating burner. Projecting through a suitable aperture in the end wall of one of the end frames 4, and removably threaded into one end of the storage tank 6, is an arm 9, to the outer end of which is rigidly secured an inclined pipe or auxiliary generating burner 10, provided with a plurality of burner apertures 11, in the lower surface thereof.

Disposed longitudinally in front of the apertures 8, of the primary burner, and with the ends thereof projecting through and supported by the end frames 4, is a main or primary oil-gas generating tube or pipe 12, having a spiral spring or coil 13, disposed therein. Removably threaded into one end of the main generating pipe 12, is one end of an oil control valve 14, the other end of which is connected to an oil feed pipe 15, which is attached to a primary oil supply pressure tank 16, disposed to one side of the framework 2, or in any other convenient place. Mounted longitudinally of the storage tank 6, and directly below the main generating pipe 12, is a wick starting burner 18.

Removably threaded into the other end of the main generating pipe 12, is a stub connecting arm 19, which projects through a suitable opening provided for the purpose in one of the end frames 4, and has integrally formed at right angles on the outer end thereof, an inclined auxiliary generating pipe or superheater 20, which is closed at its upper end and open at its lower end. The lower open end of the generating pipe 20, is closed by means of a stopper or plug 21, removably threaded into the open end of said generating pipe to permit cleaning thereof. As clearly shown in Figs. 3 and 14, the inclined generating pipe 20, is disposed below the inclined auxiliary burner 10, and is parallel thereto to permit the flames issuing from the apertures 11, to heat said inclined generating pipe, as hereinafter more fully described.

Integrally formed at right angles near the lower end of the inclined generating pipe, and parallel to and below the stub arm 19, is a short nozzle pipe 22, having a small passage 23, therein, which continues on through the generating pipe 20, communicating with a passage 24, in said generating pipe, and also communicating with an enlarged threaded passage to afford a seat 25, at the point where said passages join. The enlarged passage is formed longitudinally in a pipe extension or arm 26, integrally formed at right angles to the inclined generating pipe 20, near the lower end thereof and opposite to the nozzle pipe 22. Adjustably threaded in the enlarged passage of the pipe extension 26, is a threaded shank or screw 27, having integrally formed on one end thereof a valve rod 28, of reduced diameter affording an inclined or tapered portion 29 between said shank and valve rod, adapted to engage in the seat 25. The valve rod 28, projects longitudinally through the passage 23, and has its outer end tapered, as denoted by the numeral 30, to permit the same to seat or project into a tapered oil-gas outlet passage formed in a valve plug 31, removably threaded into the outer end of the short nozzle pipe 22, thereby affording a suitable oil-gas outlet nozzle which is positioned with the end thereof axially alined and opposite to the open end of the carbureting pipe 7, as shown in Fig. 4. The outer end of the pipe extension 26, is provided with an enlarged chamber in which is seated a suitable packing 32, disposed around a valve stem or rod 33, integrally formed on the other end of the shank 27. Said valve stem 33, projects outwardly through a cap 34, removably threaded upon the outer end of the pipe extension 26, for holding the packing 32, in position. The outer end of the valve stem 33, is of rectangular cross-section to afford a means for readily adjusting the oil-gas inlet valve mechanism.

Integrally formed at each end of the top wall of the storage tank 6, is a socket 35, having an opening 36, therein. A secondary burner is removably secured in each of the sockets 35, and comprises a stand or feed pipe 37, the lower end of which is adapted to rotatably and removably fit into one of the sockets 35, over the opening 36, therein. Formed integrally on the upper end of each feed pipe 37, is an apertured bottom or base plate 38, having a peripheral notch or groove therein to permit a burner casing 39, to seat upon said base plate. Pivotally mounted upon each of the base plates 38, to form a valve, is a shutter or a regulating or controlling disk 40, provided with a handle 41, which extends outwardly through a suitable slot in the burner casings, to afford a means for swinging the disk 40, to regulate the flow of oil-gas from the storage tank 6, into the burner casings. Projecting outwardly from one side of each of the burner casings 39, is a burner tube or pipe 42, having a plurality of slots or openings 43, in the top thereof.

Mounted longitudinally above each of the burner tubes 42, is a secondary oil-gas generating pipe or tube 44, provided with an oil inlet control valve 45, on its inner end. The outer end of each of the generating tubes 44, extends to within a short distance of the outer end of the respective burner tubes and has removably threaded therein a passaged elbow 46, one arm of which is vertically positioned and has removably threaded or secured therein, a gas tip 47, having a restricted outlet passage therein. Secured upon each of the tips 47, is a downwardly curved baffle plate or hood 48. Suitable supply or feed pipes 49, connect the inlet control valves 45, with a secondary oil supply pressure tank or reservoir 50, mounted to one side of the framework 2, or in any other suitable position. Disposed on opposite sides of the furnace 3, are carbureting or flue pipes 51, the upper ends of which are horizontal and project into suitable apertures or passages 52, formed in the furnace wall. The other end of each of the flue pipes 51, is bent downwardly and is positioned a short distance from and directly above the outlet opening in one of the oil-gas tips 47, as clearly shown in Fig. 1. A baffle plate or block 53, is positioned within the furnace 3, opposite the inner ends of the passages 52, to afford an obstruction whereby flames entering the furnace are deflected upwardly into the heating chamber of the furnace.

The operation is as follows:

To start the device, kerosene or any other suitable hydro-carbon fuel is supplied from the primary pressure tank 16, through the pipe 15, into the primary generating pipe 12, the valve 14, of course, being open. The wick of the starting burner 18, is saturated with alcohol and lighted, the heat therefrom tending to rapidly heat the primary generating pipe 12, and the spring 13, therein, thus causing a primary volatilization of the oil within the said generating pipe to form an oil-gas, which passes through the inclined generating pipe 20, into the passage 23, of the nozzle, the end of which is disposed opposite the air intake or open end of the carbureting pipe 7. By turning the valve stem 33, the tapered end 30, of the valve rod 28, is unseated, thus permitting the oil-gas to pass through the restricted outlet passage into the carbureting pipe 7, to be mixed with air which is drawn into the open end of said carbureting pipe. The carbureted air thus forms a suitable fuel gas which passes upwardly into the storage tank or casing 6, the shutters 40, being in closed position, to prevent escape of the oil-gas into the secondary burners.

The oil-gas thus generated and flowing into the storage tank 6, passes outwardly through the apertures 8, forming the primary burner, and also passes into the inclined auxiliary burner 10, and out through the burner apertures 11, thereof. The oil-gas thus escaping through the apertures 8 and 11, is ignited, the resulting flames from the apertures 8 and 11, striking or passing around the respective primary generating pipe 12, and the inclined generating pipe 20, and the oil-gas nozzle mechanisms, thereby volatilizing the kerosene passing into the main generating pipe 12, and the inclined generating pipe 20, to generate more gas by the burning of oil-gas already generated, thus permitting the process of oil-gas generation to continue, after being started by the starting burner which, of course, goes out after the alcohol with which the wick was saturated has been burned up.

After the device has been started as described, the shutter valves 40, are opened, permitting the oil-gas from the storage tank 6, to flow into the casings 39, of the secondary burners, and then into the burner tubes 42, and out through the openings 43. The escaping gas is, of course, lighted, the flames passing upwardly around the secondary oil-gas generating pipes 44, and also around the elbows 46, striking the inner or under surfaces of the hoods 48, thus also heating the same and the gas tips 47. By opening the control valves 45, kerosene or other suitable oil is admitted from the pressure tank 50, into the heated generating pipes 44, and is volatilized to form a gas which passes upwardly through the restricted outlet openings in the gas tips 47, and into the flue pipes 51, and is mixed with air drawn into the lower open ends of said flue pipes. The oil-gas thus generated, flows into the furnace 3, through the passages 52, and is ignited. The flames produced thereby strike against the baffle block 53, and are deflected upwardly into the main heating chamber of the furnace. Due to the novel arrangement of the oil-gas generating mechanisms, the gas generated therein is heated during its entire passage through said mechanisms, and is not allowed to cool off before it is mixed with air. This construction prevents carbonization of the gas nozzles and gas tips, which are thus kept clean and free from clogging. If, however, any foreign substances contained in the kerosene oil are deposited in the nozzle or in the secondary gas generating mechanisms, the respective plug 21, valve plug 31, or the gas tips 47, as the case requires, may be removed to permit cleaning of the parts.

I am aware that various details of construction may be varied through a wide range without departing from the principles of this invention, and I therefore do not desire to limit the patent granted otherwise than necessitated by the prior art.

I claim as my invention:

1. An oil-gas generator, comprising a primary generating mechanism, a starting burner associated therewith for initially heating the same to form an oil-gas, primary burner means adapted to burn said oil-gas to continue the generation of oil-gas, secondary burner means connected with said primary burner means, secondary generating mechanisms disposed thereabove, and baffle means forming a part thereof, said secondary generating mechanisms and said baffle means adapted to be heated by the flames from said secondary burner means to form more oil-gas.

2. In a hydro-carbon generator of the class described, primary generating means, starting means associated therewith for initially heating the same to form an oil-gas, a storage tank for said oil-gas, primary burner means integrally forming a part thereof adapted to burn said oil-gas for continuing the generation of oil-gas, secondary burner means adjustably mounted on said tank adapted to receive and burn oil-gas from said tank, and secondary generating means supported by said secondary burner means and adapted to be heated thereby to cause the generation of oil-gas in said secondary generating means.

3. A hydro-carbon generator comprising a starting burner, main generating means associated therewith for forming an oil-gas, an auxiliary generating means connected with said main generating means, a storage tank, primary burner means forming a part thereof for continuing the generation of oil-gas, auxiliary burner means connected with said tank adapted to heat said auxiliary generating means to assist in the process of gas generation and secondary burner and generating means mounted on said tank for generating an oil-gas for use in furnaces and the like.

4. A hydro-carbon generator comprising a starting burner, main generating means associated therewith for forming an oil-gas, an auxiliary generating means connected with said main generating means, a storage tank, primary burner means forming a part thereof for continuing the generation of oil-gas, auxiliary burner means connected with said tank adapted to heat said auxiliary generating means to assist in the process of gas generation, secondary burner means movably mounted on said tank to burn oil-gas therefrom, and secondary generating means disposed above said secondary burner means to be heated thereby to generate a fuel oil-gas.

5. A hydro-carbon generator comprising a starting burner, main generating means associated therewith for forming an oil-gas, an auxiliary generating means connected with said main generating means, a storage tank, primary burner means forming a part thereof for continuing the generation of oil-gas, auxiliary burner means connected with said tank adapted to heat said auxiliary generating means to assist in the process of gas generation, adjustable burners on said storage tank, oil vaporizing means disposed on said adjustable burner, and carbureting means positioned to receive the vaporized oil from said vaporizing means and mix air therewith for generating a fuel oil-gas.

6. A burner of the class described comprising a storage tank, primary, auxiliary and secondary burners associated therewith, and oil-gas generating means associated with each of said primary, auxiliary and secondary burners.

7. In a burner mechanism of the class described, a storage tank, primary, auxiliary and secondary burners associated therewith, primary and auxiliary generating means associated with said primary and auxiliary burners for causing the generation of oil-gas, and secondary generating means adapted to be heated by said secondary burners to generate more oil-gas adaptable for use in stoves, furnaces and similar devices.

8. In a device of the class described, a primary generator, a starting burner therebelow to initially heat the same to cause the generation of oil-gas, a tank for receiving said generated oil-gas, a primary burner and an auxiliary burner adapted to burn said generated oil-gas to continue the generation of oil-gas, adjustable secondary burners for burning the oil-gas in said tank, and secondary generators on said secondary burners adapted to be heated thereby to cause the generation of more oil-gas to be used as a fuel in furnaces and similar devices.

9. The combination with a furnace, of carbureting tubes connected therewith, baffle means therebelow for supplying vaporized oil to said tubes to carburet air therewith to form an oil gas adapted for use as a fuel in said furnace, burners for heating said baffle means, an oil-gas tank supporting said burners and supplying oil-gas thereto, a primary burner and an auxiliary burner connected with said tank, a primary generator and an auxiliary generator associated with said primary and said auxiliary burners respectively to generate an oil-gas for storage in said tank, and a starting burner below said primary generator to start the process of oil-gas generation.

10. In a device of the class described the combination with a tank, of means for generating an oil-gas for storage in said tank, burners adjustably mounted on said tank to burn the oil-gas stored therein, oil vaporizing means mounted on said burners to be heated thereby, means connected with said vaporizing means for supplying oil thereto, a gas tip on each of said vaporizing means to permit escape of the vaporized oil, a baffle member forming a part of each of said gas tips to facilitate heating of the same, and carbureting tubes above said gas tips to receive the escaping vaporized oil and mix air therewith to form an oil-gas fuel.

11. In an apparatus of the character specified, means for generating gas; a secondary burner having a hollow head adapted to receive the gas and a tubular extension extending from said head provided with gas jet outlets; a gas generating member mounted upon the said burner and extending longitudinally of said extension and adapted to be heated by the gas jets issuing therefrom, means for supplying oil to the generating member and a carbureting flue into which the said member discharges.

12. In combination with a furnace, a carbureting tube connected therewith, generating means for supplying gasified oil to said tube to carburet air therein to form an oil-gas adapted for use as a fuel in said furnace, a burner for heating said generating means, an oil-gas tank supplying oil-gas to said burner, a primary gas generator connected with said tank to generate an oil-gas for storage in said tank, and a primary burner to heat said primary gas generator.

13. In a device of the class described the combination with a tank, of means for generating an oil-gas for storage in said tank, a burner mounted on said tank to burn the oil-gas stored therein, an oil vaporizing means mounted on said burner and heated thereby, means for supplying oil to said vaporizing means, a gas jet tip at the outlet of said vaporizing means, a baffle member adjacent such gas tip to facilitate heating of the same, and a carbureting tube into which the gas tip discharges the vaporized oil to mix air therewith and form an oil-gas.

14. An oil-gas generator, comprising a primary generating mechanism, to form an oil-gas, primary burner means adapted to burn said oil-gas to continue the generation of oil-gas; a burner supplied with gas from said primary generating means; and secondary gas generating means, and baffle means forming a part thereof, said secondary generating means and said baffle means being heated by the said burner to form more oil-gas.

15. A hydro-carbon generator comprising a primary generating means for forming an oil-gas, a storage tank, primary burner means supplied with gas from said tank and forming a part of said tank for continuing the generation of oil-gas by the primary generating means, a burner movably mounted on said tank and burning oil-gas supplied therefrom; and secondary generating means disposed above said burner and heated thereby to generate a fuel oil-gas.

16. A hydro-carbon generator comprising a primary generating means for forming an oil-gas, an auxiliary generating means connecting with said primary generating means, a storage tank, primary burner means for continuing the generation of oil-gas; an auxiliary burner means connected with said tank adapted to heat said auxiliary generating means to assist in the process of gas generation, a burner on said storage tank, oil vaporizing means disposed above the latter burner and heated thereby, and carbureting means positioned to receive the gas from said vaporizing means and mix air therewith for generating a fuel oil-gas.

17. In combination with a furnace having carbureting tubes connected with its opposite sides; generating means for forming an oil-gas; a burner communicating with said generating means; and oil vaporizing means disposed on said burner, and positioned to discharge the vaporized oil into said tubes, substantially as described.

18. In combination with a furnace having carbureting tubes connected with its opposite sides; generating means for forming an oil-gas; primary burner means for continuing the generation of oil-gas; a burner communicating with said generating means; and oil vaporizing means disposed on said burner and adapted to discharge the vaporized oil into said tubes, substantially as described.

19. In combination with a furnace having carbureting tubes connected with its opposite sides, and an intermediate baffle; generating means for forming an oil-gas; a storage tank; primary burner means for continuing the generation of oil-gas; a burner communicating with said storage tank; and oil vaporizing means disposed on said burner and adapted to discharge the vaporized oil into said carbureting tubes, substantially as described.

20. In an apparatus of the character specified, means for generating gas; a burner having a hollow head adapted to receive the gas from the generating means, said head having a tubular extension extending from said head provided with gas jet outlets; a gas generating member extending longitudinally of said extension and adapted to be heated by the gas jets issuing therefrom, and a carbureting flue into which the gases generated in said generating member are discharged and mixed with air, substantially as described.

21. In a device of the class described the combination with a tank, of means for generating an oil-gas discharging into said tank; a burner mounted on said tank and supplied with gas therefrom, said burner having a lateral extension; independent oil vaporizing means mounted on the extension of said burner and heated thereby; means for supplying oil to said oil vaporizing means; and a carbureting tube into which the said vaporizing means discharges the vaporized oil to mix air therewith and form a fuel, substantially as described.

22. In a hydro-carbon gas-generator of the class described, primary gas generating means to form an oil-gas; a storage tank for the gas generated by said means, a primary burner means forming part of said chamber adapted to burn said oil-gas for continuing the generation thereof by the primary generating means; a burner mounted on said tank and adapted to receive and burn gas therefrom, said burner having a lateral extension; and a secondary gas generating means mounted above and heated by the extension of said burner to generate additional gas, substantially as described.

23. In combination with a furnace having carbureting tubes connected therewith at opposite sides thereof; secondary oil gas generators delivering oil vapors into the inlet ends of said tubes; burners for heating the said secondary generators; and primary hydrocarbon gas generating means supplying gas to heat the said burners, substantially as described.

24. In combination with a furnace having opposite carbureting tubes connected with its opposite sides, and an intermediate baffle; a secondary oil gas generator connected with said tubes for supplying gasified hydrocarbon to said tubes; a burner for heating the said secondary generator; and primary means for generating hydrocarbon gases to supply gas to the said burner.

25. In apparatus of the character specified; a tank having apertures in its side forming a primary burner; a mixing tube communicating therewith; a main generating pipe beside said tank adjacent the primary generating burner; a superheater at one end of the tank and connected at one end with the main generating pipe and communicating at the other end with the inlet of said mixing tube; means for admitting air to the mixing tube; means for controlling the supply of fuel to the main generating pipe; a secondary generating burner connected with the end of the tank and provided with apertures for the escape of gas to heat the superheater; and burner casings connected with the tank.

26. In apparatus of the character specified; a storage tank having apertures in its sides forming a primary generating burner, and a plurality of openings; a mixing tube at the bottom of said tank communicating at one end therewith; a main generating pipe beside said tank adjacent the primary generating burner and communicating with the end of said mixing tube; and means for controlling the supply of fuel to the generating pipe; with a plurality of burner casings each connected with an opening in the storage tank, and each provided with a valve for controlling the admission of gas from said storage tank to such casing.

27. In apparatus of the character specified; a storage tank having a plurality of apertures in its sides forming a primary generating burner, and a plurality of openings in its top; a mixing tube or pipe at the bottom of said tank communicating at one end therewith; a main generating pipe beside said tank adjacent the primary generating burner apertures therein; a superheater at one end of the tank and connected at one end with the main generating pipe and communicating at its other end with the inlet of said mixing tube; means for controlling the supply of fuel to the generating pipe; a secondary generating burner connected with the end of the tank and provided with apertures for the escape of gas to heat the superheater; a plurality of burner casings respectively connected with the openings in said tank; and means for admitting air into the mixing tube.

28. In apparatus of the character specified, a tank having apertures in its side forming a primary generating burner; a mixing tube communicating therewith; a main generating pipe beside said tank adjacent the primary generating burner; a superheater at one end of the tank and connected at one end with the main generating pipe and communicating at the other end with the inlet of said mixing tube; means for admitting air to the mixing tube; means for controlling the supply of fuel to the main generating pipe; and a secondary generating burner connected with the end of the tank and provided with apertures for the escape of gas to heat the superheater; with a plurality of secondary burner casings each connected with an opening in the storage tank, and each provided with a valve for controlling the admission of gas from said storage tank to said casing.

In testimony whereof I have hereunto subscribed my name in the presence of two subscribing witnesses.

AUGUST A. RUSTEBERG.

Witnesses:
EARL M. HARDINE,
CHARLES W. HILLS, Jr.